E. G. WARNER.
Grain Rake.
No. 48,606. Patented July 4, 1865.
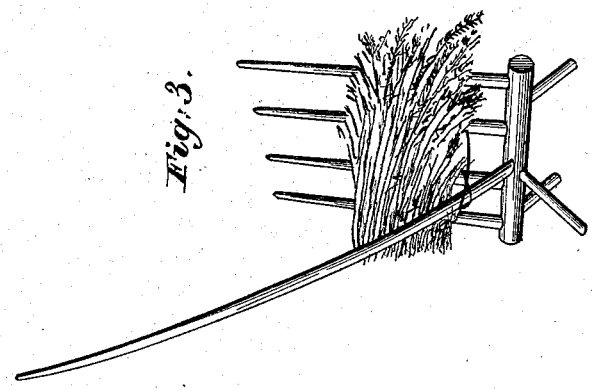
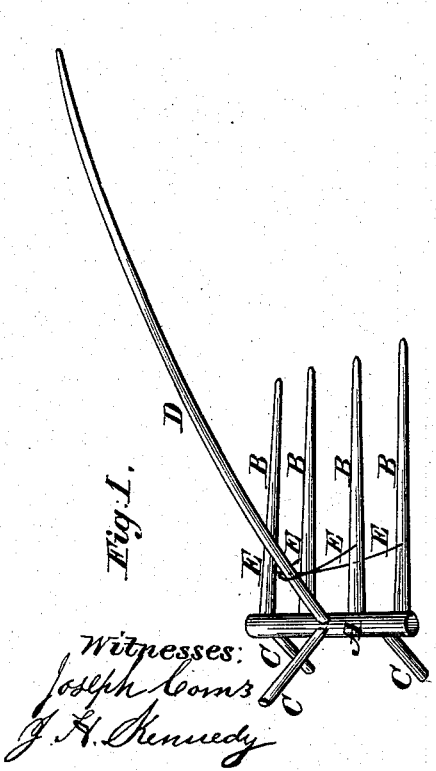
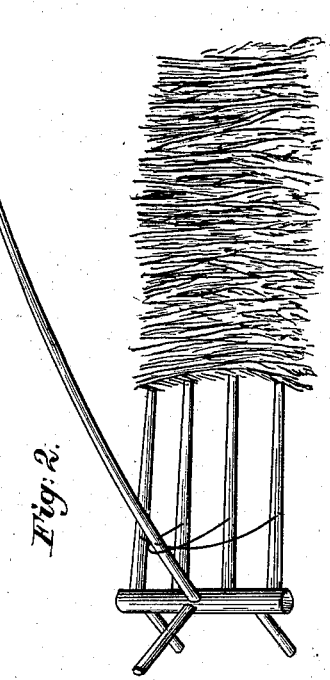

UNITED STATES PATENT OFFICE.

ELI G. WARNER, OF UNION TOWNSHIP, MADISON COUNTY, OHIO.

IMPROVEMENT IN GRAIN-RAKES.

Specification forming part of Letters Patent No. 48,606, dated July 4, 1865.

*To all whom it may concern:*

Be it known that I, ELI G. WARNER, of Union township, in the county of Madison and State of Ohio, have invented a new and Improved Grain-Rake; and I do hereby declare that the following is a full and exact description thereof, reference being had to the annexed drawings, making a part of this specification, in which—

Figure 1 is a perspective view, with letters of reference marked thereon.

To enable others to make and use my invention, I will proceed to describe its construction and use.

I take a head-block, A, of suitable size, in which I insert two, three, or more teeth, B B B B, on the opposite side of which I insert pins C C C or attach feet. About midway between the teeth and feet I insert a handle, D.

E E E E are braces for strengthening the teeth, and they also form a platform, on which the grain rests when the teeth are raised from the ground.

To operate with the above-described implement, the operator will lay the rake on the ground, as shown in Fig. 2, at the beginning of the swath to be gathered. The rake is to be drawn forward until sufficient grain is gathered on the teeth to make a sheaf. The handle is then raised, by which means the rake is thrown on its feet and the collected grain is raised out of the stubble, as shown in Fig. 3, ready for the hands of the binder, without his stooping to raise it from the ground.

I do not wish to be understood as confining myself to any particular size or material of which the above-described rake may be constructed; but

What I claim as my invention, and desire to secure by Letters Patent, is—

The construction of a rake with feet and long teeth, braced to the handle in such a manner as to form a platform, on which the grain will lie, raised out of the stubble ready for the hands of the binder, as above described.

ELI G. WARNER.

Witnesses:
   JOSEPH CARNS,
   J. H. KENNEDY.